Sept. 17, 1940.  E. E. PITTMAN ET AL  2,214,909
TREATMENT OF DISTILLERY SLOP AND OTHER WASTE LIQUIDS
Filed Oct. 31, 1938
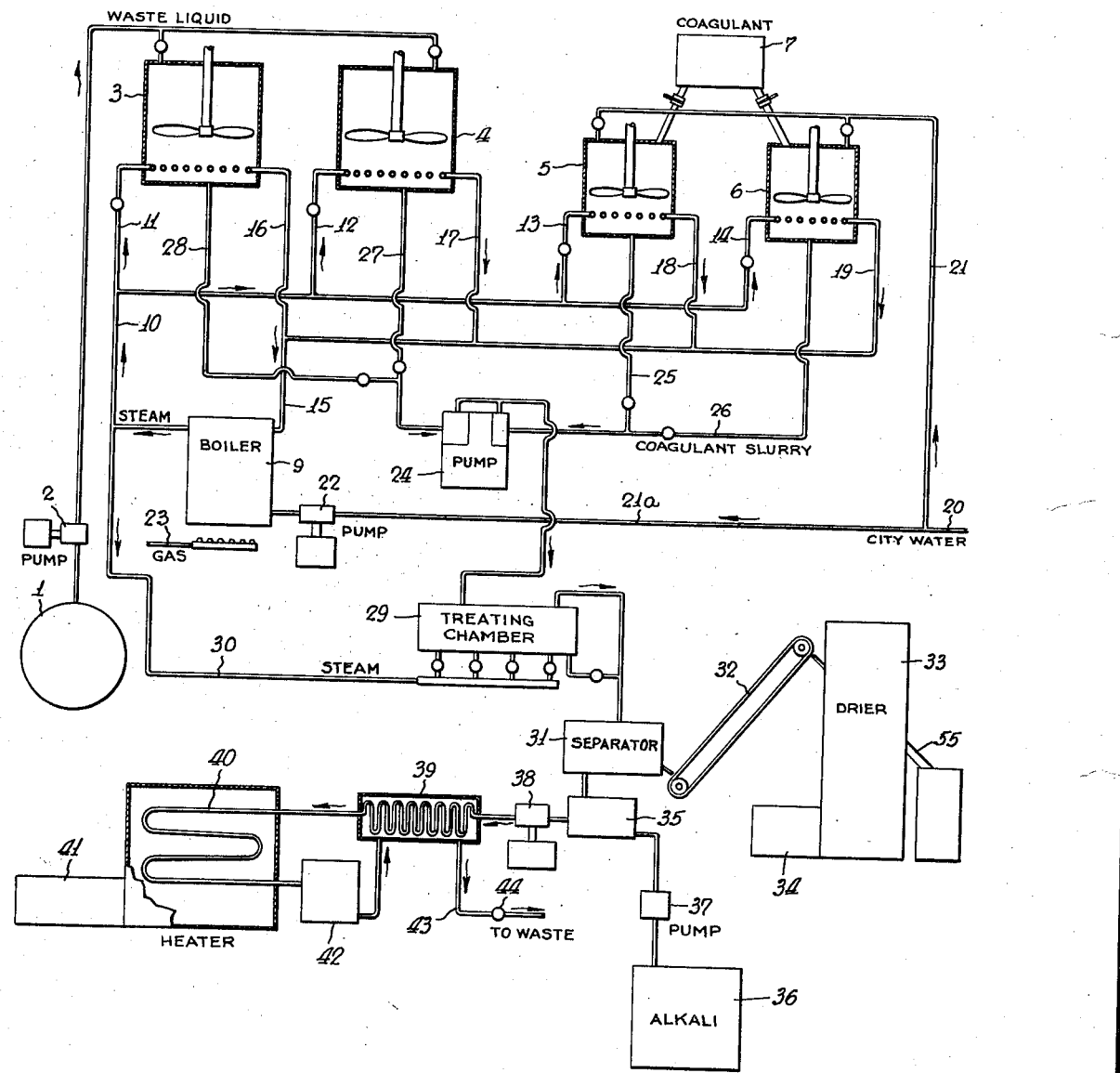
INVENTOR
Robert Roger Bottoms
Ernest E. Pittman
BY
ATTORNEYS

UNITED STATES PATENT OFFICE 2,214,909

TREATMENT OF DISTILLERY SLOP AND OTHER WASTE LIQUIDS

Ernest E. Pittman and Robert Roger Bottoms, Louisville, Ky., assignors to The Girdler Corporation, Louisville, Ky., a corporation of Delaware Application October 31, 1938, Serial No. 237,972

20 Claims. (Cl. 99—2)

This invention relates to the treatment of industrial waste liquids which contain useful organic matter which it is commercially desirable to recover but which are not readily removable therefrom by settling, filtration, or centrifuging, and which may undergo decomposition, fermentation, oxidation, or other change to produce highly objectionable conditions when said waste liquids are discharged untreated into streams, lakes, or analogous places. Such waste liquids may include distillery slop or waste liquids from industrial plants in which the waste contains organic materials comprising a portion which can be recovered by this invention as a useful by-product, and a portion which is non-recoverable and will form a substantial nuisance. The organic content which may be recovered by means of our process may be used as cattle food, fertilizer, or the like.

Even after the removal of such valuable ingredients, however, there usually remains organic matter which may readily unite with oxygen, due to mere contact therewith or by the action of enzymes, microorganisms, or the like. Sanitary and health officials, particularly those in thickly settled communities or having supervision or authority over municipal or other water supply, or over intra or interstate streams or bodies of water, endeavor to prevent such waste liquids from being discharged into the same. The amount and character of the oxidizable constituents is expressed in terms of B. O. D. (biochemical oxygen demand) and in many places officials consider a five-day B. O. D. value of over 200 to be the upper permissible limit and in many cases the limit is much lower. A five-day B. O. D. of 200 means that 200 parts of oxygen per million parts of water (both by weight) is required to support the maximum bacterial growth which can occur in the liquid during a period of five days.

Distillery slop includes sugars and other carbohydrates, glycerine, proteins, certain organic acids, and other organic matter, and when evaporation processes are employed to solve the problem of disposal of this slop, it is found that the residue is in an unsatisfactory form and the cost, operation, and maintenance of the evaporators are expensive.

In carrying out our invention, our process involves as an essential part thereof the treatment of the waste liquid so as to substantially completely convert any non-recovered organic matter into compounds which have no B. O. D. or other objectionable characteristics. In the treatment of waste liquids containing valuable recoverable ingredients together with non-recovered constituents giving a high B. O. D. to the residual liquid, the process includes two successive steps, the first of which involves the removal of said valuable constituents; and the second of which involves the substantially complete destruction or decomposition of the remaining objectionable ingredients. The organic matter which may be present may be entirely in solution or substantially all in fine suspension, or some in solution and some in suspension.

In the accompanying drawing, there is shown in the single figure a diagrammatical showing of an apparatus in which the entire process may be carried out. The process will be described in connection with the treatment of distillery slop but it will be understood that the process, so far as applicable, may be employed for a wide variety of industrial waste liquids. The process will be described as a continuous process but it will be understood that either the first, or the second, or both steps may be carried out as a batch process.

As an important step in the process, the hot waste liquid is treated with a bentonite which will greatly swell in water, form a suspension, and is highly adsorptive. The mixture is then subjected to filtration, centrifuging, or other separating action. The bentonite is preferably first made into a slurry or bentonite slip by mixing with water and this slip is added to and mixed with the waste liquid, although when desired, the bentonite may be sifted into the waste liquid as a dry material. In the treatment of distillery slop this mixing is done preferably before any other treatment of the slop and at the normal pH of the thick slop. As certain of the operations such, for instance, the preliminarily heating the waste liquid where necessary or the formation of the slurry or both are in some cases preferably batch operations, certain portions of the apparatus are arranged in duplicate so that one unit may be used as a source of supply while the preparation of the batch is going on in the other unit.

In the use of the apparatus as illustrated in the drawing, the liquid to be treated may be supplied from a supply tank 1, or from any other suitable source, and may be delivered from such tank by means of a pump 2 to a pair of storage tanks 3 and 4, which are preferably provided with suitable agitators for maintaining the solid matter in suspension, and may be provided with heating coils to maintain the liquid at the desired temperature. Only one such tank may be required and no heating is necessary if the waste liquid is taken directly from its source of production at the desired temperature.

The dry bentonite may be stored in a hopper 7 and may be delivered therefrom to slurry tanks 5 and 6 which are provided with suitable agitating means and equipped for the delivery of water thereto. If desired, heating means may be provided. Any other suitable type of apparatus for forming the bentonite slip may be used. In some cases the dry bentonite may be added directly to the waste liquid. The heating when desired may be effected in a boiler 9 and the hot water or steam delivered to the coils of the tanks 3 and 4, and to tanks 5 and 6 through a pipe line 10 having valve controlled branches 11, 12, 13, and 14, and may be returned, after condensation, if steam is used, through a pipe line 15 having return branches 16, 17, 18, and 19. Water may be delivered from a supply pipe 20 having a valve controlled branch 21 leading to the tanks 5 and 6 and a branch 21a leading to a feed water pump 22 for the boiler. The boiler 9 may be heated in any suitable manner as, for instance, by gas burners supplied through a pipe 23.

The water and bentonite may be mixed in any desired proportions to form the bentonite slip, but in most cases the proportions are preferably about one part dry bentonite to fifteen parts of water. The proportions may be varied in accordance with the particular slop treated and the procedure employed in the process from which the slop is derived.

Having prepared the bentonite slip in one of the tanks 5, 6, and preferably after the prepared slip has aged for a period of time, and having a supply of the heated distillery slop in one of the tanks 3, 4, the slop and slip are withdrawn in predetermined relative proportions by means of a proportioning pump 24 withdrawing slip from the tanks 5 or 6 through valve-controlled pipes 25 and 26, and withdrawing the distillery slop or other waste liquid through valve-controlled pipes 27 or 28. The proportioning pumps may be set to deliver the desired relative proportions of slop and slip. When dry bentonite is used any desired proportioning means may be employed to maintain the desired ratio of bentonite and waste liquid, and the pump may then be used only for pumping, and not for proportioning. For a distillery slop resulting from a Bourbon mix of about 65% corn and 35% rye, the slop and bentonite slip are delivered by the proportioning pump in the ratio of about ten gallons of slop to one gallon of the bentonite slip, but this proportion will vary with variations of the bentonite in the slip and may vary with the character of the slop. The quantity of bentonite (dry weight) to the protein in solution should be about 1 to 1 and ordinarily neither should be less than one-half of the other to obtain the best results. However, in those distilleries in which set-back fermentation is not employed, and in which the soluble solids content of the slop will be low, it is evident that a greatly reduced amount of bentonite, either as a slurry or in dry form can be used satisfactorily.

The pump delivers the mixture of the slop and slip to a treating chamber 29 which may be in the form of a drum, and where the mixture is maintained at the desired temperature, preferably that approaching the boiling point, for the desired length of time for the bentonite to effect the coagulation or agglomeration of the soluble proteins or other constituents which may be coagulated and the colloidal and other suspended ingredients of the slop. The temperature is retained at some value above 70° C. by suitable lagging or insulation and may be maintained in any suitable manner as, for instance, by steam jets supplied through the pipe 30 or by steam coils within the tank 29, or by gas heaters thereneath, or by any other convenient heating means. When the coagulating action has been carried on to the desired extent, usually after a period of ten minutes or more in the case of an average thick Bourbon or rye slop, the contents of the drum are withdrawn and subjected to separatory action. The mixture may be treated in the chamber 29 as separate successive batches and the pump 24 intermittently operated, or the chamber may be one for the continuous passage of the mixture therethrough at the desired rate, and the pump 24 may be continuously operated.

The separatory action may be effected by a settling chamber, but preferably, the separation is facilitated and speeded up, for instance, by the use of a vacuum filter, a filter press or a centrifugal separator. A separatory unit is indicated on the drawing as 31 and it will be understood that the character of this unit may vary in different installations. If the treatment in the chamber 29 be a continuous one rather than a batch operation, a plurality of the separatory units 31 may be employed, simultaneously or alternately, or the filtering or the centrifuging may be by a type of apparatus adapted to operate continuously.

The solid material which has been found to possess remarkable filter aid properties, and which contains useful organic constituents and which may be in the form of a filter cake is withdrawn from the separator 31 and delivered by a conveyor 32 to a drier 33 heated in any suitable manner, for instance, by coal-fired furnace 34 and the dried material may be delivered through a chute 35 for bagging or other preparation for shipment as a feed or ingredient of a feed for cattle, hogs, fowls, or other animals, or for a fertilizer or for any other desired purpose.

This improved product when made from distillery slop contains not only all of suspended solids of the original slop which are grain husks, yeast, cells, etc., but also contains the bentonite coagulated proteins which were in solution, together with the bentonite used as a protein coagulant and which adds valuable mineral ingredients to the feed. It has a higher protein content than is the case where conventional screening methods are employed because in our process soluble and colloidally suspended proteins are removed and incorporated in the feed. Such a feed is substantially free from the objectionable gums which were in solution in the slop and which are retained where the conventional evaporative method is employed. Furthermore the pH of the feed is substantially the same as that of the original slop and is slightly on the acid side which is highly desirable.

The liquid separated from the solids in the separator 31 and which contains certain soluble non-recovered organic constituents such as carbohydrates, organic acids, glycerine, lignins, proteinaceous matters, etc., and having nuisance-forming characteristics, is further treated to destroy those constituents and to reduce the B. O. D. In contrast with the foregoing step of the process which recovers a useful by-product from a waste having nuisance-forming characteristics, the step employed for reducing the B. O. D. of the residual liquid prevents any subsequent recovery of worthwhile amounts of any by-product and results in the practically complete destruction or decomposition of the organic or oxidizable nuisance-forming constituents.

The process consists essentially in the treatment of the liquid under high temperature and high pressure. Preferably an oxide or hydroxide of an alkali or alkali earth metal is added in a sufficient amount to neutralize the waste liquid and to combine with all of the carbon content of the organic compounds present in such liquid. Lime which is highly suitable for this purpose is preferably used as a slurry which may be made up in a tank 36 and delivered by a pump 37 to the tank 35, and the residual waste liquid coming from the separator is also delivered to this tank. The mixture of waste liquid and lime slurry may be withdrawn by a pump 38 and delivered through a heat interchanger 39 to a heater 40 which may be heated in any suitable manner, for instance, by a furnace 41. If the process be a continuous one the heater may be a coil and if a batch one it may be an autoclave.

The liquid delivered from the heater 40 may be held in a soaking drum 42 for a required length of time if such be necessary, and is then delivered through the heat interchanger 39 to a waste pipe 43 which is provided with a valve-controlled outlet 44 whereby the desired high pressure may be maintained in the heater 40 and the soaking drum 42. The temperature maintained in the heater and in the soaking drum is preferably about 350° C. and ordinarily should not be below 250° C. or above about 375° C. The pressure is developed by the pump 38 and as a result of the treatment of the liquid with the said alkaline slurry at such temperature, and under the exceptionally high pressure resulting from the heating of the confined liquids, the organic matter in solution or suspension is substantially completely decomposed.

In some cases it is desirable to add an oxidizing agent along with the lime or other alkaline base to better insure the destruction of organic matter such as unfermentable sugars. This may be manganese dioxide or other analogous agent.

The lime slurry when used may be made of quick lime or calcium hydroxide, and it acts to convert substantially all of the carbon of the organic matter into calcium salts and most of the nitrogen is also split off as ammonia. If some of the organic matter in the liquid is in the form of organic acids such as lactic acid or succinic acid, salts of these acids may be formed by the lime without complete decomposition of the acid radicals. The discharge from the heating coil or the soaking drum may be delivered directly to the sewer or to lakes or streams without danger of objectionable pollution as the B. O. D. will have been reduced to such a low figure as to be negligible or non-objectionable.

Having thus described the invention, we claim:

1. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of at least 250° C. to decompose a substantial portion of the residual organic compounds in solution.

2. The process of reducing to a very low value the B. O. D. of industrial waste liquids such as distillery slop, which includes coagulating dissolved and suspended proteins by the action of bentonite, removing the coagulated material and other solids, and thereafter subjecting the liquid to a high pressure at a temperature of at least 250° C. to decompose a substantial portion of the residual organic compounds in solution.

3. A method of treating an organic waste material in aqueous form including, mixing an adsorbent bentonite material therewith to form a recoverable agglomerate therein, separating the agglomerate from the aqueous material in the form of a useful by-product, and thereafter subjecting the aqueous residue of the waste material to a destructive action under high pressure at a temperature of at least 250° C. in order to decompose a substantial portion of the remaining nuisance-forming organic constituents in the waste material.

4. A method of treating an organic waste material in aqueous form including, mixing therewith an adsorbent bentonite material and thereby forming a recoverable agglomerate, separating the agglomerate from the aqueous material in the form of a useful by-product, mixing an alkaline material with the residual liquid from the separation step, and thereafter subjecting the so treated residual liquid to a destructive action under high pressure at a temperature of at least 250° C. in order to decompose remaining nuisance-forming organic constituents in the waste material.

5. The process of reducing to a very low value the B. O. D. of industrial waste liquids such as distillery slop, which includes subjecting the liquid to the action of bentonite at a temperature of at least 70° C., removing the suspended solids and the resulting coagulated material, and thereafter subjecting the liquid to a high pressure at a temperature of at least 250° C. to decompose a substantial portion of the residual organic compounds in solution.

6. The process of reducing to a very low value the B. O. D. of industrial waste liquids such as distillery slop, which includes mixing bentonite with the liquid, holding the mixture at a temperature of at least 70° C. for at least five minutes, removing the suspended solids and the resulting coagulated material, and thereafter subjecting the liquid to a high pressure at a temperature of at least 250° C. to decompose a substantial portion of the residual organic compounds in solution.

7. The process of reducing to a very low value the B. O. D. of industrial waste liquids such as distillery slop, which includes coagulating dissolved and suspended proteins by the action of bentonite, the bentonite and the dissolved proteins each being present in an amount equal to at least one-half the amount of the other, removing the coagulated material and other solids, and thereafter subjecting the liquid to a high pressure at a temperature of at least 250° C. to decompose a substantial portion of the residual organic compounds in solution.

8. The process of reducing to a very low value the B. O. D. of industrial waste liquids such as distillery slop, which includes coagulating dissolved and suspended proteins by the action of bentonite, the bentonite and the soluble proteins being present in the ratio of about 1 to 1, removing the coagulated material and other solids, and thereafter subjecting the liquid to a high pressure at a temperature of at least 250° C. to decompose a substantial portion of the residual organic compounds in solution.

9. The process of reducing to a very low value the B. O. D. of industrial waste liquids such as distillery slop, which includes coagulating dissolved and suspended proteins by the action of bentonite, removing the coagulated material and other solids, and thereafter heating the liquid to at least 250° C. and holding it at that temperature for sufficient time to decompose a substantial portion of the residual organic material.

10. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of about 350° C. to decompose a substantial portion of the residual organic compounds in solution.

11. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature between 250° C. and 375° C. to decompose a substantial portion of the residual organic compounds in solution.

12. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of at least 250° C. in the presence of a material selected from the group consisting of oxides and hydroxides of alkali and alkali earth metals, to decompose a substantial portion of the residual organic compounds in solution.

13. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of at least 250° C. in the presence of a material selected from the group consisting of oxides and hydroxides of alkali and alkali earth metals, and an oxidizing agent to decompose a substantial portion of the residual organic compounds in solution.

14. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of at least 250° C. in the presence of lime to decompose a substantial portion of the residual organic compounds in solution.

15. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of at least 250° C. in the presence of lime and an oxidizing agent to decompose a substantial portion of the residual organic compounds in solution.

16. The process of reducing to a very low value the B. O. D. of industrial waste liquids such as distillery slop, which includes adding an adsorbing agent for the soluble proteins, removing the solids in suspension and said agent, together with the adsorbed portion of the soluble proteins, and thereafter subjecting the liquid to a high pressure at a temperature of at least 250° C. in the presence of a material selected from the group consisting of oxides and hydroxides of alkali and alkali earth metals, in an amount sufficient to neutralize the acids present and combine with substantially all of the carbon of the organic compounds to decompose a substantial portion of the residual organic compounds in solution.

17. The process of reducing the B. O. D. of distillery slop, which includes adding bentonite in an amount such that the ratio of bentonite to the dissolved proteins is about 1 to 1, maintaining the mixture at a temperature of at least 70° C. to effect coagulation of dissolved proteins and the bentonite, removing the suspended solids and coagulated material, adding lime to the residual liquid and heating said last mentioned liquid to a temperature of at least 250° C. to effect decomposition of a substantial portion of the residual organic compounds in the solution.

18. The process of reducing to a very low value the B. O. D. of industrial waste liquids, which includes coagulating dissolved and suspended proteins by the action of bentonite, removing the coagulated material and other solids, and thereafter heating the liquid under pressure to a temperature of at least 250° C. in the presence of lime.

19. The process of reducing to a very low value the B. O. D. of industrial waste liquids, which includes coagulating dissolved and suspended proteins by the action of bentonite, removing the coagulated material and other solids, and thereafter heating the liquid under pressure to a temperature of at least 250° C. in the presence of an oxide of an alkali earth metal.

20. The process of reducing to a very low value the B. O. D. of industrial waste liquids, which includes adding bentonite in dry form to effect coagulation of the bentonite and dissolved and suspended ingredients of the liquid, and thereafter subjecting the liquid to a temperature of at least 250° C. under pressure.

ERNEST E. PITTMAN.
ROBERT ROGER BOTTOMS.